(12) United States Patent
Minei et al.

(10) Patent No.: US 10,507,788 B2
(45) Date of Patent: Dec. 17, 2019

(54) AIRBAG DEVICE FOR PEDESTRIAN PROTECTION

(71) Applicant: TOYOTA JIDOSHA KABUSHIKI KAISHA, Toyota-shi, Aichi-ken (JP)

(72) Inventors: Taichi Minei, Toyota (JP); Kenichiro Yoshimoto, Toyota (JP); Akihiro Osanai, Toyota (JP); Yuta Iwai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/705,574

(22) Filed: Sep. 15, 2017

(65) Prior Publication Data
US 2018/0099638 A1 Apr. 12, 2018

(30) Foreign Application Priority Data

Oct. 11, 2016 (JP) ................................. 2016-200209

(51) Int. Cl.
*B60R 21/36* (2011.01)
*B60R 21/2338* (2011.01)

(52) U.S. Cl.
CPC .... *B60R 21/36* (2013.01); *B60R 2021/23386* (2013.01)

(58) Field of Classification Search
CPC ....................... B60R 21/36; B60R 2021/23386
See application file for complete search history.

(56) References Cited

U.S. PATENT DOCUMENTS

| | | | |
|---|---|---|---|
| 8,016,066 B1 * | 9/2011 | Boxey | B60R 21/36 180/271 |
| 9,073,513 B2 * | 7/2015 | Kalliske | B60R 21/36 |
| 2004/0232663 A1 * | 11/2004 | Takimoto | B60R 21/2338 280/730.1 |
| 2006/0151228 A1 * | 7/2006 | Kalliske | B60R 21/2338 180/274 |
| 2013/0200603 A1 * | 8/2013 | Bergenheim | B60R 21/36 280/762 |
| 2014/0332302 A1 | 11/2014 | Thomas | |
| 2014/0332304 A1 | 11/2014 | Thomas | |
| 2016/0264093 A1 * | 9/2016 | Suemune | B60R 21/36 |

FOREIGN PATENT DOCUMENTS

| | | | | |
|---|---|---|---|---|
| CN | 104709222 A | | 6/2015 | |
| DE | 102012222006 A1 * | | 8/2013 | ............ B60R 21/36 |
| EP | 2502794 A1 * | | 9/2012 | ............ B60R 21/36 |
| JP | 2007-153062 A | | 6/2007 | |
| JP | 2007216938 A * | | 8/2007 | ......... B60R 21/2338 |
| JP | 2008-222148 A | | 9/2008 | |
| JP | 4517873 B2 | | 8/2010 | |
| WO | 2012/161642 A1 | | 11/2012 | |

* cited by examiner

*Primary Examiner* — Drew J Brown
(74) *Attorney, Agent, or Firm* — Oliff PLC

(57) ABSTRACT

An airbag device includes an airbag, straps, and strap covers. The airbag is stored in a cowl portion. The airbag configured to be deployed on the front surface side of windshield glass, and to cover the cowl portion and front pillars at least in part. A first end of each of the straps is attached to an upper portion of an outer surface of the airbag in the vehicle up-down direction and a second end of each of the straps is attached to the cowl portion. The straps pass between the airbag and the strap covers. The strap covers are sewn to the outer surface of the airbag and cover the straps.

14 Claims, 7 Drawing Sheets

AIRBAG DEVICE FOR PEDESTRIAN PROTECTION

INCORPORATION BY REFERENCE

The disclosure of Japanese Patent Application No. 2016-200209 filed on Oct. 11, 2016 including the specification, drawings and abstract is incorporated herein by reference in its entirety.

BACKGROUND

1. Technical Field

The disclosure relates to an airbag device for pedestrian protection.

2. Description of Related Art

Japanese Unexamined Patent Application Publication No. 2008-222148 (JP 2008-222148 A) discloses an airbag device for pedestrian protection including a cowl bag portion extending in the right-left direction, a pillar bag portion extending obliquely upward from both ends of the cowl bag portion, and a binding unit binding the cowl bag portion and the pillar bag portion to each other. The binding unit takes the form of a substantially band-shaped strap in its plan view.

SUMMARY

In an airbag device for pedestrian protection including an airbag that is provided with a strap and is deployed ahead of a windshield in the vehicle front-rear direction, the strap might be caught by a wiper, a hood, and so on in a case where the airbag is deployed. Then, deployment of the airbag might not be performed as intended. Accordingly, the configuration including the airbag that is provided with the strap and is deployed ahead of the windshield in the vehicle front-rear direction has room for improvement for inhibition of airbag deployment to be suppressed.

The disclosure is to obtain an airbag device for pedestrian protection configured to include an airbag that is provided with a strap and is deployed ahead of a windshield in the vehicle front-rear direction and capable of suppressing inhibition of airbag deployment by the strap.

An aspect of the disclosure relates to an airbag device for pedestrian protection including an airbag stored in a cowl portion, the airbag configure to be deployed on the front surface side of a windshield, and to cover the cowl portion and front pillars at least in part, straps, a first end of each of the straps being attached to an upper portion of an outer surface of the airbag in the vehicle up-down direction and a second end of each of the straps being attached to the cowl portion, and strap covers sewn to the outer surface of the airbag and covering the straps, the straps passing between the airbag and the strap covers.

According to the aspect described above, the strap passes between the airbag and the strap cover and the strap is covered by the strap cover in the airbag device for pedestrian protection. In a case where the airbag is deployed, intrusion of another member into the space between the airbag and the strap is restricted by the strap cover. As a result, catching of the strap by another member can be further suppressed than in a configuration lacking the strap cover, and thus inhibition of the deployment of the airbag by the strap can be suppressed.

In the aspect described above, the airbag may include a lower cloth and an upper cloth sewn to the lower cloth and disposed above the lower cloth in the vehicle up-down direction and the strap covers may be sewn to an outer surface as an outer peripheral surface of the lower cloth.

According to the aspect described above, intrusion of a wiper into the space between the strap and the lower cloth of the airbag can be restricted by the strap cover in a case where the airbag of the airbag device for pedestrian protection is deployed. As a result, catching of the strap by the wiper can be further suppressed than in a configuration lacking the strap cover.

In the aspect described above, the strap covers may include widened portions wider than the other parts in the directions intersecting with the extension directions of the straps.

According to the aspect described above, the airbag, the strap, and the strap cover of the airbag device for pedestrian protection are folded and stored in the cowl portion. The second end of the strap is attached to the cowl portion. The size of the space between the strap and the strap cover is larger in the widened portion than in the rest (than at the part other than the widened portion). Accordingly, in a case where the strap is pulled to the second end for the second end of the strap to be attached to the cowl portion, the strap and the strap cover are less likely to come into contact with each other than in a configuration in which the strap cover maintains the same width in the extension direction of the strap. Then, a frictional force acting on the strap decreases. As a result, work for pulling the strap to the second end is performed with ease in a state where the airbag, the strap, and the strap cover are folded.

In the aspect described above, the widened portion may be provided between the first end of the strap and a center of the strap covers in the longitudinal direction.

In the aspect described above, the strap covers may include a semi-cylindrical portion convex toward the lower side in the vehicle up-down direction and the rear side in the vehicle front-rear direction and sewing portions formed in both end portions of the semi-cylindrical portion in the vehicle width direction and sewn to the outer surface of the lower cloth of the airbag when viewed from a plane orthogonal to the longitudinal direction of the strap covers.

In the aspect described above, the sewing portions may have a longitudinal length falling short of a length of the straps in the extension directions and equal to a length of the semi-cylindrical portion (in the present specification, "may be equal" includes "may be almost equal" in its meaning).

In the aspect described above, the airbag in an inflation deployment state of the airbag may have a U-shape in vehicle plan view with the vehicle rear side of the airbag open and the airbag may include an general portion extending in the vehicle width direction and covering a part of the cowl portion from the vehicle upper side, extending portions disposed in bilateral symmetry with respect to a center line of the airbag and respectively extending along the front pillars from a left side end portion of the general portion in the vehicle width direction and a right side end portion of the general portion in the vehicle width direction, and overhanging portions overhanging toward the center line in peripheral edge portions of the extending portions and on the inner sides in the vehicle width direction (in the present specification, "U-shape" includes "substantially U-shape" in its meaning).

In the aspect described above, tips of the extending portions may be positioned outside the general portion in the vehicle width direction.

In the aspect described above, the upper portion of the outer surface of the airbag in the vehicle up-down direction may be the overhanging portions.

In the aspect described above, the overhanging portions may have a trapezoidal shape (in the present specification, "trapezoidal shape" includes "substantially trapezoidal shape" in its meaning).

In the aspect described above, a first end of the strap covers in the longitudinal direction may be sewn to the overhanging portions of the airbag and a second end of the strap covers in the longitudinal direction on the sides to the first end of the strap covers may be loose without being sewn to the airbag.

According to the aspect described above, inhibition of the airbag deployment by the strap can be suppressed in the configuration including the airbag provided with the strap and deployed ahead of the windshield in the vehicle front-rear direction.

According to the aspect described above, catching of the strap by the wiper can be suppressed.

According to the aspect described above, work for pulling the strap to the second end is performed with ease in a state where the airbag, the strap, and the strap cover are folded.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, an airbag device for pedestrian protection according to a first embodiment of the disclosure will be described. The arrows FR, RR, UP, and OUT that are appropriately shown in each accompanying drawing represent the forward direction of a vehicle (direction in which it proceeds), the rearward direction of the vehicle, the upward direction, and the outward direction in the width direction of the vehicle, respectively. The arrow W represents the vehicle width direction. Unless otherwise noted, the front-back, right-left, and up-down directions in the following description represent the front and back in the front-rear direction of the vehicle, the right and left in the right-left direction of the vehicle (vehicle width direction), and the upper and lower sides in the up-down direction of the vehicle, respectively.

Overall Configuration

Figure 1:
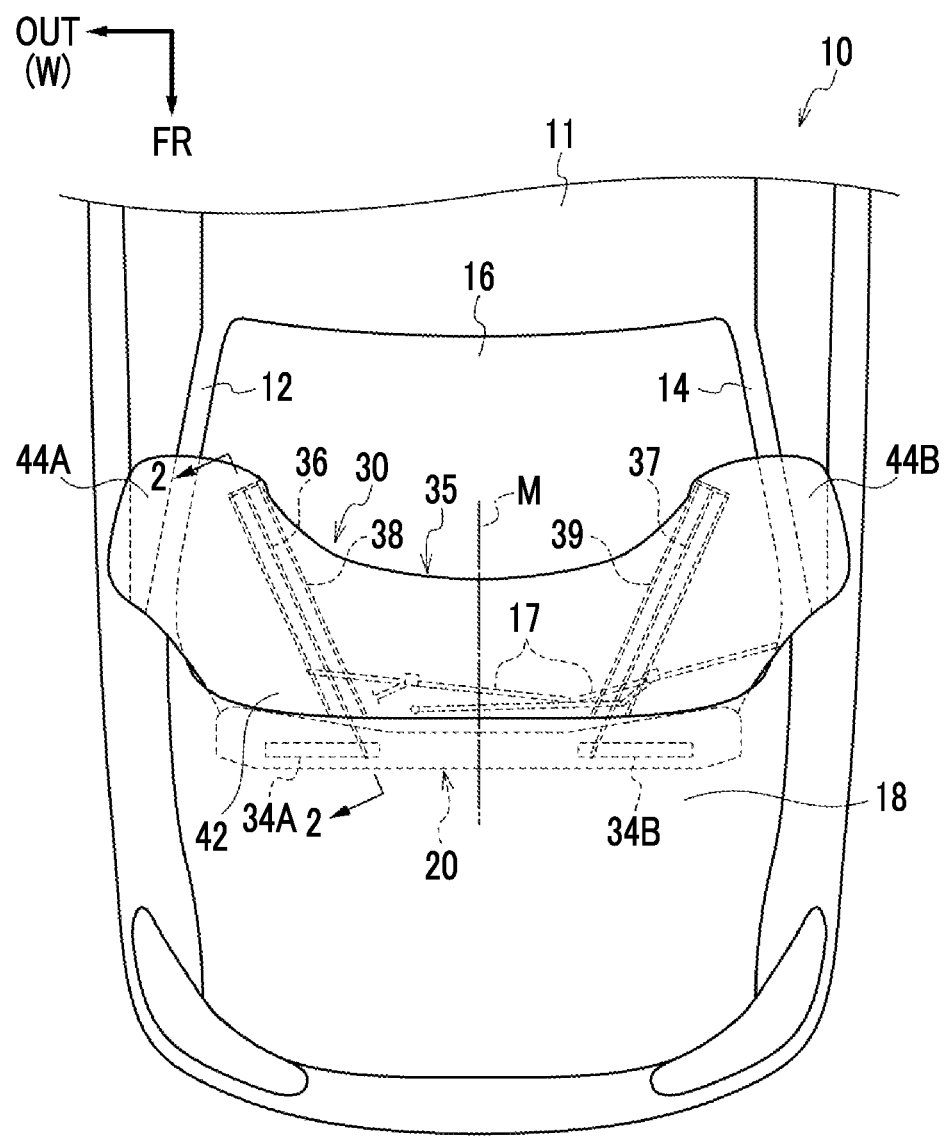
FIG. 1 is a plan view illustrating a front portion of a vehicle in a state where an airbag according to a first embodiment is deployed.

A front portion of a vehicle 10 according to the embodiment is illustrated in FIG. 1. The vehicle 10 is configured to include front pillars 12, 14, windshield glass 16, wipers 17, a hood 18, a cowl portion 20, and an airbag device 30 as an example of the airbag device for pedestrian protection. The windshield glass 16 is an example of a windshield. The airbag device 30 is to suppress contact between a pedestrian's head and a front portion of a vehicle body 11, which is made up mainly of the front pillars 12, 14.

Figure 2:
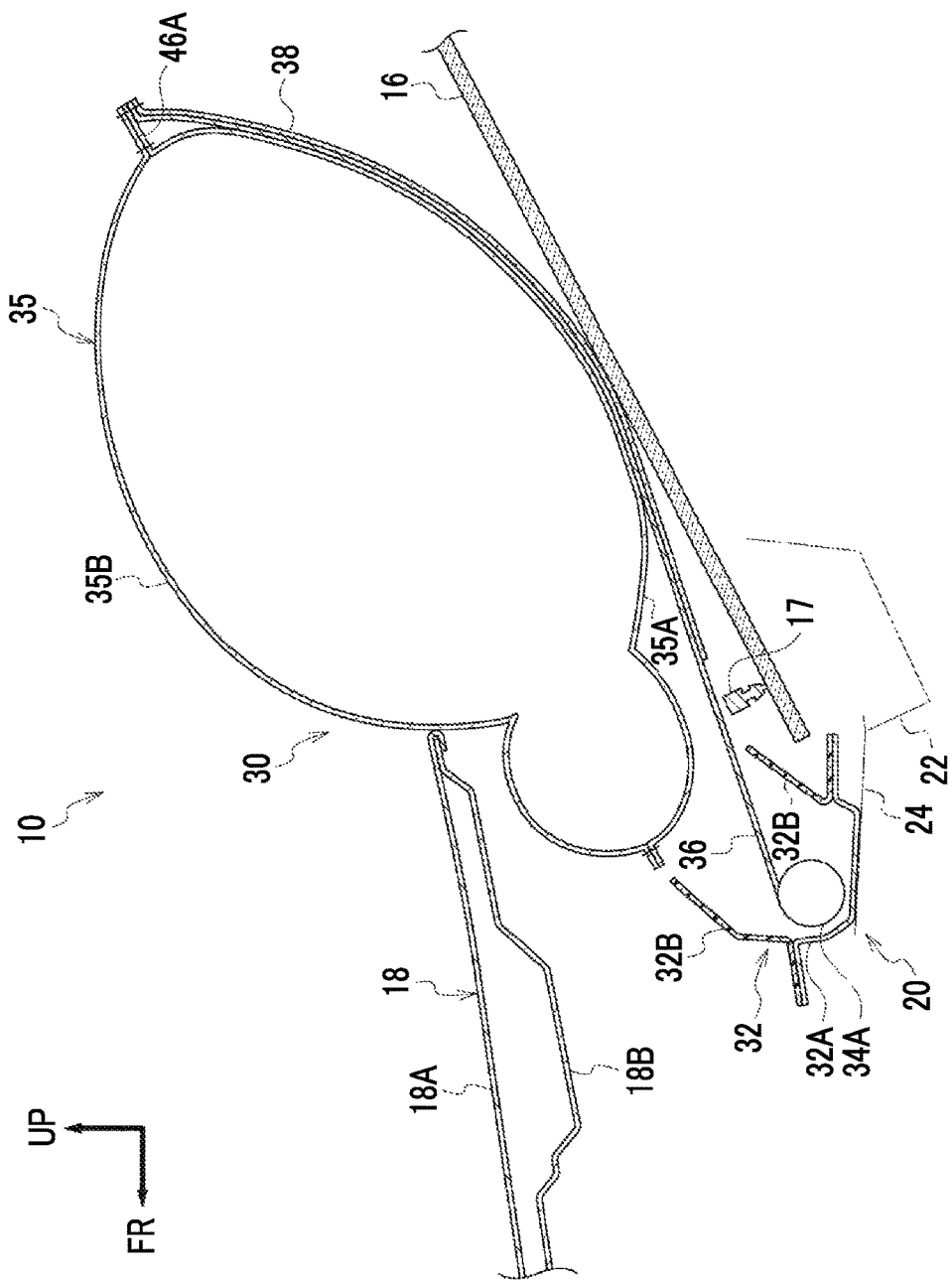
FIG. 2 is a longitudinal sectional view (sectional view taken along line 2-2 of FIG. 1) illustrating a state of disposition of the airbag, a strap, and a strap cover according to the first embodiment.

The hood 18 illustrated in FIG. 2 is disposed above an engine compartment (not illustrated). A hood outer panel 18A and a hood inner panel 18B constitute the hood 18 by their outer peripheral edge portions being bound to each other. The hood outer panel 18A forms a design surface, and the hood inner panel 18B is disposed on the vehicle lower side of the hood outer panel 18A. The hood outer panel 18A and the hood inner panel 18B are formed by, for example, press forming of steel plates.

The cowl portion 20 is disposed on the vehicle rear side of the hood 18 and above a dash panel (not illustrated) partitioning the engine compartment and the cabin of the vehicle from each other. The cowl portion 20 extends in the vehicle width direction. The cowl portion 20 is configured to include a cowl panel 22 and a cowl front panel 24, which is bound to an upper end portion of the cowl panel 22 and disposed ahead of the windshield glass 16 on the front side of the vehicle. Each member constituting the cowl portion 20 is formed by, for example, press forming of a steel plate. An airbag case 32 is disposed in the cowl portion 20.

Configuration of Main Parts

The airbag device 30 illustrated in FIG. 2 is arranged on an upper surface of the cowl front panel 24 and is stored in the airbag case 32. The airbag device 30 is configured to include a pair of right and left inflators 34B, 34A (refer to FIG. 1), an airbag 35, straps 36, 37 (refer to FIG. 1), and strap covers 38, 39 (refer to FIG. 1). A state where the airbag 35 is deployed is illustrated in FIG. 2.

Airbag Case

Figure 3:
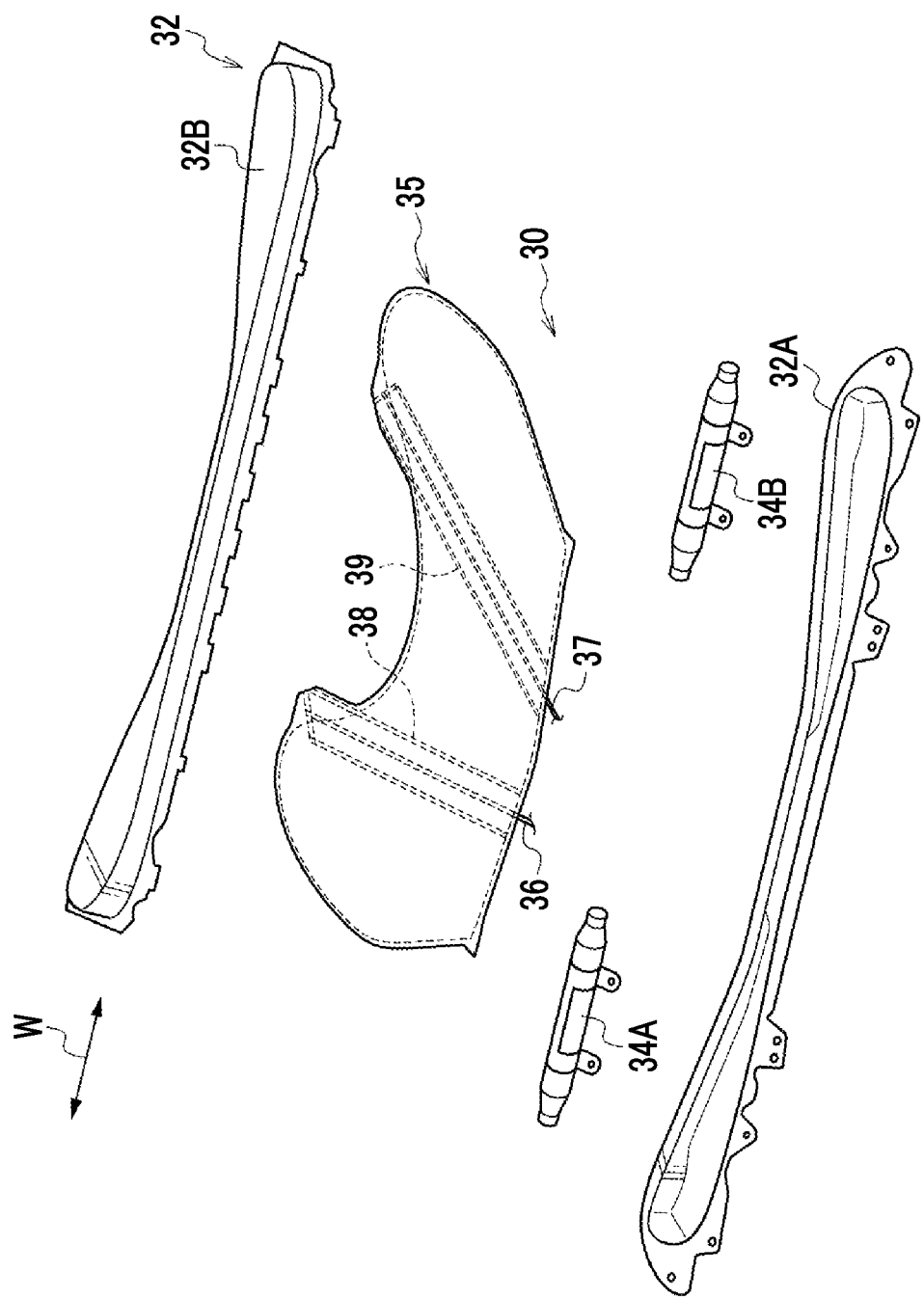
FIG. 3 is an exploded view of an airbag device for pedestrian protection and a cowl portion according to the first embodiment.

As illustrated in FIG. 3, the airbag case 32 has a lower case 32A and an upper case 32B and extends in the vehicle width direction. The lower case 32A illustrated in FIG. 2 is formed by, for example, press forming of a sheet metal. When viewed from the vehicle width direction, the lower case 32A has a substantially hat shape with its vehicle upper side open. The upper case 32B is formed from, for example, a thermoplastic olefin-based material (TPO material). When viewed from the vehicle width direction, the upper case 32B has a substantially hat shape with its vehicle lower side open.

The lower case 32A and the upper case 32B are bound to each other by means such as pawl engagement and a double-sided adhesive tape with their respective flange portions superposed on each other. As a result, the airbag case 32 has the shape of a hollow body that has a substantially rectangular shape when viewed from the vehicle width direction. Illustrated in FIG. 2 is a state where the upper case 32B is broken into two by the airbag 35 being deployed.

Inflators

As illustrated in FIG. 1, the inflator 34A is disposed on the left side with respect to a center line M, which is in the center of the vehicle 10 in the vehicle width direction. The inflator 34B is disposed on the right side with respect to the center line M. The inflators 34A, 34B are spaced apart from each other in the vehicle width direction in the airbag case 32 (refer to FIG. 2). The inflators 34A, 34B are cylinder-type inflators and are disposed in a certain posture such that their axial directions are substantially along the vehicle width direction. Each of the inflators 34A, 34B is connected to a gas inlet (not illustrated) disposed in the airbag 35. The inflators 34A, 34B are fastened to the cowl front panel 24 (refer to FIG. 2) along with the lower case 32A (refer to FIG. 2).

The inflators 34A, 34B are electrically connected to a controller (not illustrated). The controller is electrically connected to a collision detection sensor (not illustrated) or a collision prediction sensor (not illustrated) arranged in the vehicle 10. Upon detecting a collision, the controller outputs an operation signal to the inflators 34A, 34B. As a result, a gas is blown into the airbag 35 from gas blowing units of the inflators 34A, 34B, and then inflation deployment of the airbag 35 is performed. During the inflation deployment of the airbag 35, the upper case 32B (refer to FIG. 2) comes into contact with the airbag 35 and is broken into two in the vehicle up-down direction.

Airbag

As illustrated in FIG. 2, the airbag 35 has the shape of a bag with, for example, outer peripheral portions of two cloths rarely permeated by a gas sewn to each other in a state where they are superposed on each other in the vehicle up-down direction. In other words, the airbag 35 is configured to include a lower cloth 35A disposed on the lower side in the vehicle up-down direction and an upper cloth 35B disposed above the lower cloth 35A and sewn to the lower cloth 35A. In its state prior to the inflation deployment, the airbag 35 is folded in a bellows shape and stored in the airbag case 32 in the cowl portion 20. A tether (not illustrated), which is a partition cloth functioning as a partition wall, is disposed inside the airbag 35. In the inflation deployment state, tension acts on the tether inside the airbag 35, resulting in formation of small and large space portions.

As illustrated in FIG. 1, the airbag 35 in its inflation deployment state has a substantially U-shape, with its vehicle rear side open, in plan view of the vehicle. Specifically, the airbag 35 has an general portion 42, an extending portion 44A, and an extending portion 44B. The general portion 42 extends in the vehicle width direction and covers a part of the cowl portion 20 from the upper side of the vehicle. The extending portion 44A extends along the front pillar 12 from a left side end portion of the general portion 42 in the vehicle width direction. The extending portion 44B extends along the front pillar 14 from a right side end portion of the general portion 42 in the vehicle width direction. The extending portions 44A, 44B are disposed in bilateral symmetry with respect to the center line M described above. Tips of the extending portions 44A, 44B are positioned outside their base ends (general portion 42 sides) in the vehicle width direction.

Figure 4:
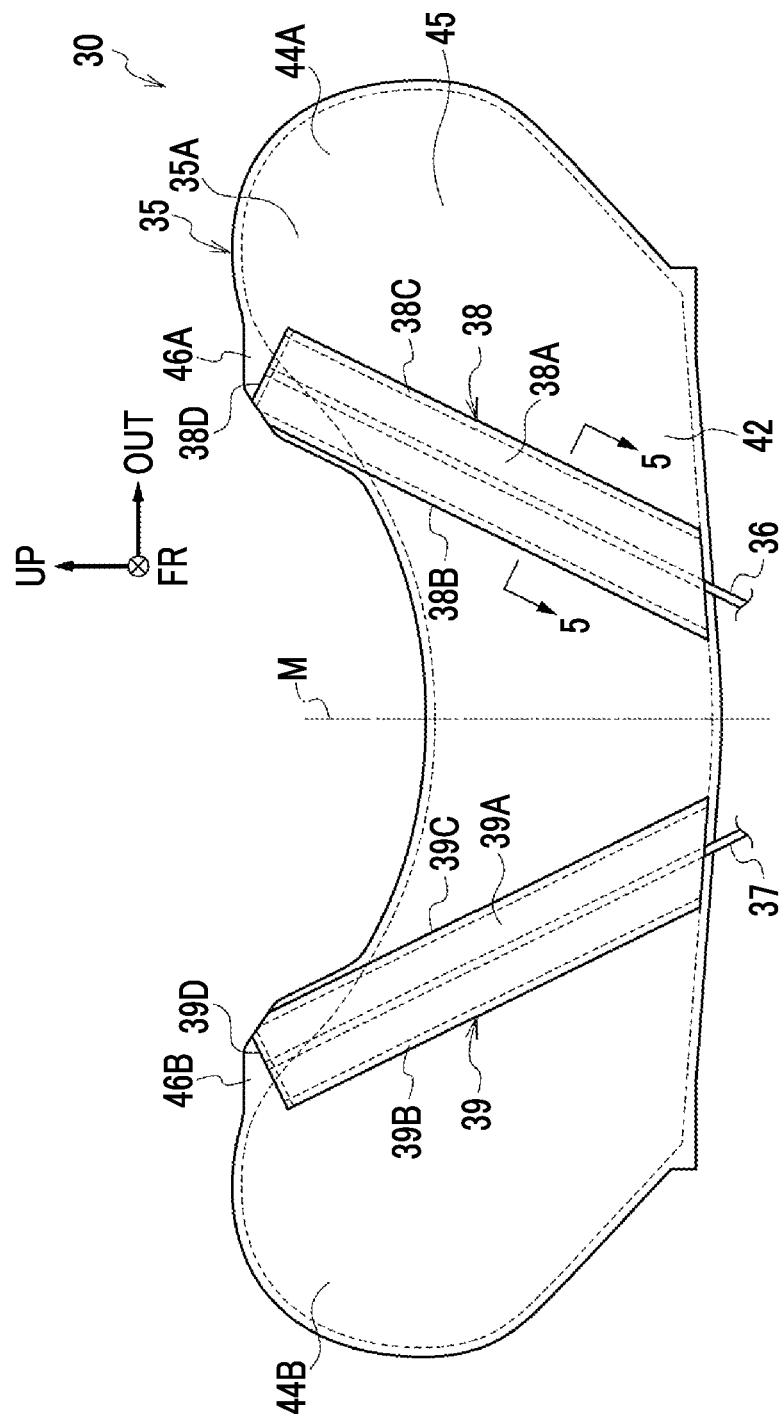
FIG. 4 is an explanatory diagram illustrating a state of the airbag according to the first embodiment where it is yet to be folded.

Illustrated in FIG. 4 is a state where the lower cloth 35A of the airbag 35 is viewed from the rear side in the front-rear direction of the vehicle. Overhanging portions 46A, 46B overhanging toward the center line M are formed at parts of peripheral edge portions of the extending portions 44A, 44B that are on the inner sides in the vehicle width direction. The overhanging portions 46A, 46B are examples of an upper portion of the airbag 35 in the vehicle up-down direction. Each of the overhanging portions 46A, 46B has a substantially trapezoidal shape. The overhanging portion 46A is disposed on the right side that is illustrated in FIG. 4 (left side of the vehicle 10 (refer to FIG. 1)). The overhanging portion 46B is disposed on the left side that is illustrated in FIG. 4 (right side of the vehicle 10 (refer to FIG. 1)).

Straps

The strap 36 is disposed on the left side (right side in FIG. 4) with respect to the center line M. The strap 36 has the shape of a rectangular band by, for example, weaving of a plurality of polyester yarns. A first end of the strap 36 (on the upper side in the vehicle up-down direction) in its extension direction (longitudinal direction) is sewn to the overhanging portion 46A of the lower cloth 35A. A second end of the strap 36 (on the lower side in the vehicle up-down direction) in its extension direction has an annular shape or the like and is attached to the inflator 34A (refer to FIG. 1). In other words, the second end of the strap 36 is attached to the cowl portion 20 (refer to FIG. 1). The first end of the strap 36 is positioned outside the second end in the vehicle width direction.

A length over which the tension acts on the strap 36 when the deployment of the airbag 35 is completed is set as the length of the strap 36 in its extension direction. As a result, the strap 36 in the inflation deployment state of the airbag 35 is stretched between the overhanging portion 46A and the inflator 34A (refer to FIG. 1). By the strap 36 being stretched, the extending portion 44A does not move outside a position facing the front pillar 12 (refer to FIG. 1) in the vehicle width direction.

The strap 37 is disposed on the right side (left side in FIG. 4) with respect to the center line M. The strap 37 is formed similarly to the strap 36. A first end of the strap 37 (on the upper side in the vehicle up-down direction) in its extension direction (longitudinal direction) is sewn to the overhanging portion 46B of the lower cloth 35A. A second end of the strap 37 (on the lower side in the vehicle up-down direction) in its extension direction has an annular shape or the like and is attached to the inflator 34B (refer to FIG. 1). In other words, the second end of the strap 37 is attached to the cowl portion 20 (refer to FIG. 1). The first end of the strap 37 is positioned outside the second end in the vehicle width direction.

A length over which the tension acts on the strap 37 when the deployment of the airbag 35 is completed is set as the length of the strap 37 in its extension direction. As a result, the strap 37 in the inflation deployment state of the airbag 35 is stretched between the overhanging portion 46B and the inflator 34B (refer to FIG. 1). By the strap 37 being stretched, the extending portion 44B does not move outside a position facing the front pillar 14 (refer to FIG. 1) in the vehicle width direction.

Figure 6:
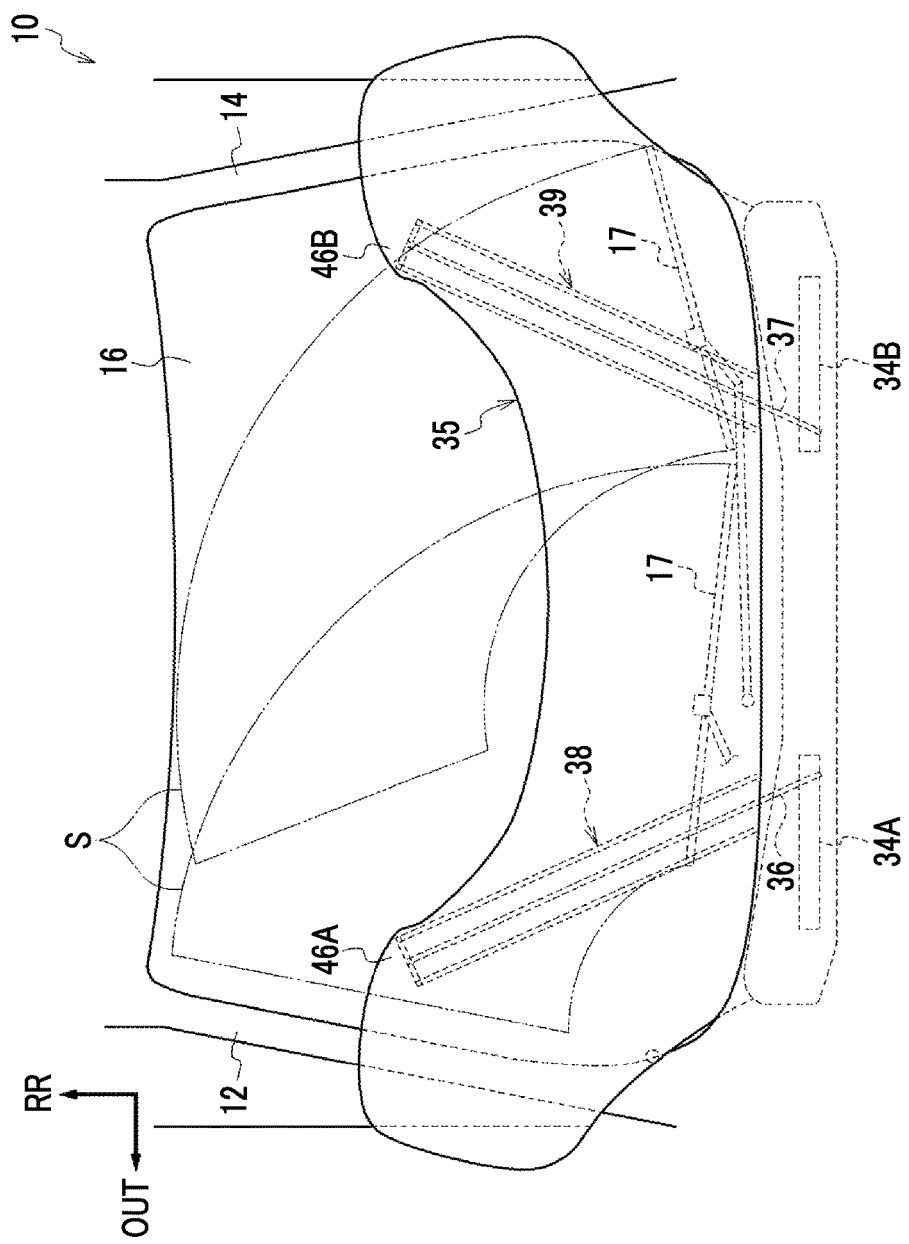
FIG. 6 is an explanatory diagram illustrating a wiping range of a windshield wiper according to the first embodiment.

As illustrated in FIG. 6, the overhanging portion 46A and the overhanging portion 46B of the airbag 35 are disposed within a wiping range S in the deployment state of the airbag 35. The wiping range S is the range of the windshield glass 16 that is covered by wiping by the wipers 17. In other words, the straps 36, 37 are configured to connect the inflators 34A, 34B and the overhanging portions 46A, 46B to each other, and thus the straps 36, 37 are disposed within the wiping range S during the deployment of the airbag 35.

Strap Cover

Figure 5:
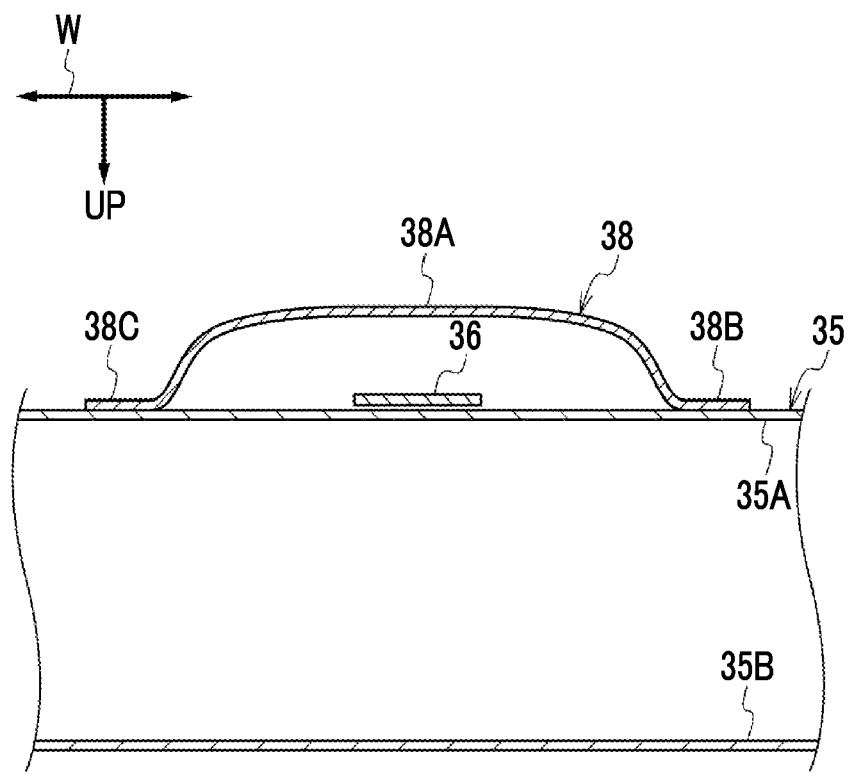
FIG. 5 is a cross sectional view (sectional view taken along line 5-5 of FIG. 4) illustrating the state of disposition of the airbag, the strap, and the strap cover according to the first embodiment.

As illustrated in FIG. 5, the strap cover 38 has a semi-cylindrical portion 38A, sewing portions 38B, 38C, and a sewing portion 38D when viewed from a plane orthogonal to the longitudinal direction. The sewing portions 38B, 38C are formed in both end portions of the semi-cylindrical portion 38A in the vehicle width direction. The strap cover 38 will be described later (refer to FIG. 4). The semi-cylindrical portion 38A is a hollow part that is convex toward the lower side in the vehicle up-down direction and the rear side in the vehicle front-rear direction from the lower cloth 35A of the airbag 35. The semi-cylindrical portion 38A has a longitudinal length that falls short of the length of the strap 36 in its extension direction and is almost equal to the length between the overhanging portion 46A and the general portion 42 of the airbag 35 (refer to FIG. 4). The space that is inside the semi-cylindrical portion 38A has a size that does not restrict the elongation (deployment) of the strap 36 during the inflation deployment of the airbag 35.

The sewing portions 38B, 38C are, for example, band-shaped parts as illustrated in FIG. 4. The sewing portions 38B, 38C are sewn to an outer surface 45, which is an outer peripheral surface of the lower cloth 35A of the airbag 35. In other words, the strap cover 38 is sewn to the outer surface 45. The sewing portions 38B, 38C have a longitudinal length that falls short of the length of the strap 36 in its extension direction and is almost equal to the length of the semi-cylindrical portion 38A. In a state where the strap 36 is stretched, the distance from the strap 36 to the sewing portion 38B is, for example, almost equal to the distance from the strap 36 to the sewing portion 38C. In other words, the sewing portion 38B and the sewing portion 38C are almost axisymmetrically disposed, about the central axis of the strap 36 as an axis of symmetry, except a first end portion and a second end portion in the longitudinal direction.

The sewing portion 38D is a band-shaped part that connects a first end of the sewing portion 38B (on the upper side in the vehicle up-down direction, that is, the overhanging portion 46A side) and a first end of the sewing portion 38C (on the upper side in the vehicle up-down direction, that is, the overhanging portion 46A side) to each other. In other words, a first end of the strap cover 38 is, for example, sewn to the airbag 35. A second end of the strap cover 38 that is on the side opposite to the first end is, for example, loose without being sewn to the airbag 35. In a case where the semi-cylindrical portion 38A is viewed in the direction in which the airbag 35 and the strap 36 are superposed on each other, the semi-cylindrical portion 38A covers most of the strap 36 in its extension direction.

The strap cover 39 is disposed such that it is axisymmetric with the strap cover 38 about the center line M as an axis of symmetry. When viewed from the plane orthogonal to the longitudinal direction, for example, the strap cover 39 has a semi-cylindrical portion 39A, sewing portions 39B, 39C, and a sewing portion 39D (described later). The sewing portions 39B, 39C are formed in both end portions of the semi-cylindrical portion 39A in the vehicle width direction. The semi-cylindrical portion 39A is a hollow part that is convex toward the lower side in the vehicle up-down direction and the rear side in the vehicle front-rear direction from the lower cloth 35A of the airbag 35. The semi-cylindrical portion 39A has a longitudinal length that falls short of the length of the strap 37 in its extension direction and is almost equal to the length between the overhanging portion 46B and the general portion 42 of the airbag 35. The space that is inside the semi-cylindrical portion 39A has a size that does not restrict the elongation (deployment) of the strap 37 during the inflation deployment of the airbag 35.

The sewing portions 39B, 39C are, for example, band-shaped parts. The sewing portions 39B, 39C are sewn to the outer surface 45 of the lower cloth 35A. In other words, the strap cover 39 is sewn to the outer surface 45. The sewing portions 39B, 39C have a longitudinal length that falls short of the length of the strap 37 in its extension direction and is almost equal to the length of the semi-cylindrical portion 39A. In a state where the strap 37 is stretched, the distance from the strap 37 to the sewing portion 39B is, for example, almost equal to the distance from the strap 37 to the sewing portion 39C. In other words, the sewing portion 39B and the sewing portion 39C are almost axisymmetrically disposed, about the central axis of the strap 37 as an axis of symmetry, except a first end portion and a second end portion in the longitudinal direction.

The sewing portion 39D is a band-shaped part that connects a first end of the sewing portion 39B (on the upper side in the vehicle up-down direction, that is, the overhanging portion 46B side) and a first end of the sewing portion 39C (on the upper side in the vehicle up-down direction, that is, the overhanging portion 46B side) to each other. In other words, a first end of the strap cover 39 is, for example, sewn to the airbag 35. A second end of the strap cover 39 is, for example, loose without being sewn to the airbag 35. In a case where the semi-cylindrical portion 39A is viewed in the direction in which the airbag 35 and the strap 37 are superposed on each other, the semi-cylindrical portion 39A covers most of the strap 37 in its extension direction.

The second end of the strap 36 in its extension direction is exposed from the second end of the strap cover 38 and is attached to the inflator 34A (refer to FIG. 1) as described above. The second end of the strap 37 in its extension direction is exposed from the second end of the strap cover 39 and is attached to the inflator 34B (refer to FIG. 1) as described above.

As described above, the straps 36, 37 and the strap covers 38, 39 are disposed on, for example, the lower cloth 35A side (lower side in the vehicle up-down direction with respect to the airbag 35). The straps 36, 37 pass between the airbag 35 and the strap covers 38, 39.

Action

Hereinafter, an action and effects of the airbag device 30 according to the first embodiment will be described. The strap 36 and the strap cover 38 that are illustrated in FIG. 4 and the strap 37 and the strap cover 39 that are illustrated in FIG. 4 are disposed in bilateral symmetry with respect to the center line M and have the same configuration as each other. Accordingly, the strap 36 and the strap cover 38 will be described below with description of the strap 37 and the strap cover 39 omitted.

The airbag device 30 is operated once a collision sensor (not illustrated) disposed in a front end portion of the vehicle 10 detects a collision with a pedestrian during traveling of the vehicle 10 illustrated in FIG. 1. In other words, the airbag 35 is inflated by the gas being supplied into the airbag 35 from the inflators 34A, 34B.

As illustrated in FIG. 2, the inflated airbag 35 is deployed on the front surface side of the windshield glass 16 with the upper case 32B broken and covers a part of the cowl portion 20, a part of the front pillar 12, and a part of the front pillar 14 (refer to FIG. 1). At this time, the strap 36 is disposed between the airbag 35 and the strap cover 38 in the airbag device 30 and the strap 36 is covered by the strap cover 38. Accordingly, in a case where the airbag 35 is deployed and the strap 36 is elongated, intrusion of another member into the space between the airbag 35 and the strap 36 is restricted by the strap cover 38.

Intrusion of another member into the space between the airbag 35 and the strap cover 38 is also restricted since the strap cover 38 is sewn to the airbag 35. As a result, catching of the strap 36 by another member during the deployment of the airbag 35 can be further suppressed than in a configuration lacking the strap cover 38, and thus inhibition of the deployment of the airbag 35 by the strap 36 can be suppressed.

In the airbag device 30 according to the first embodiment, the strap 36 and the strap cover 38 are disposed on the lower side in the vehicle up-down direction with respect to the airbag 35. Accordingly, in a case where the airbag 35 is deployed, intrusion of the wipers 17 into the space between the airbag 35 and the strap 36 can be restricted by the strap cover 38. As a result, catching of the strap 36 by the wipers 17 can be further suppressed than in a configuration lacking the strap cover 38.

Second Embodiment

Hereinafter, an airbag device for pedestrian protection according to a second embodiment of the disclosure will be described. The same reference numerals as those used in the description of the first embodiment will be used to refer to components and parts of the second embodiment that are identical in function to those of the airbag device 30 according to the first embodiment described above and description thereof will be omitted.

Figure 7:
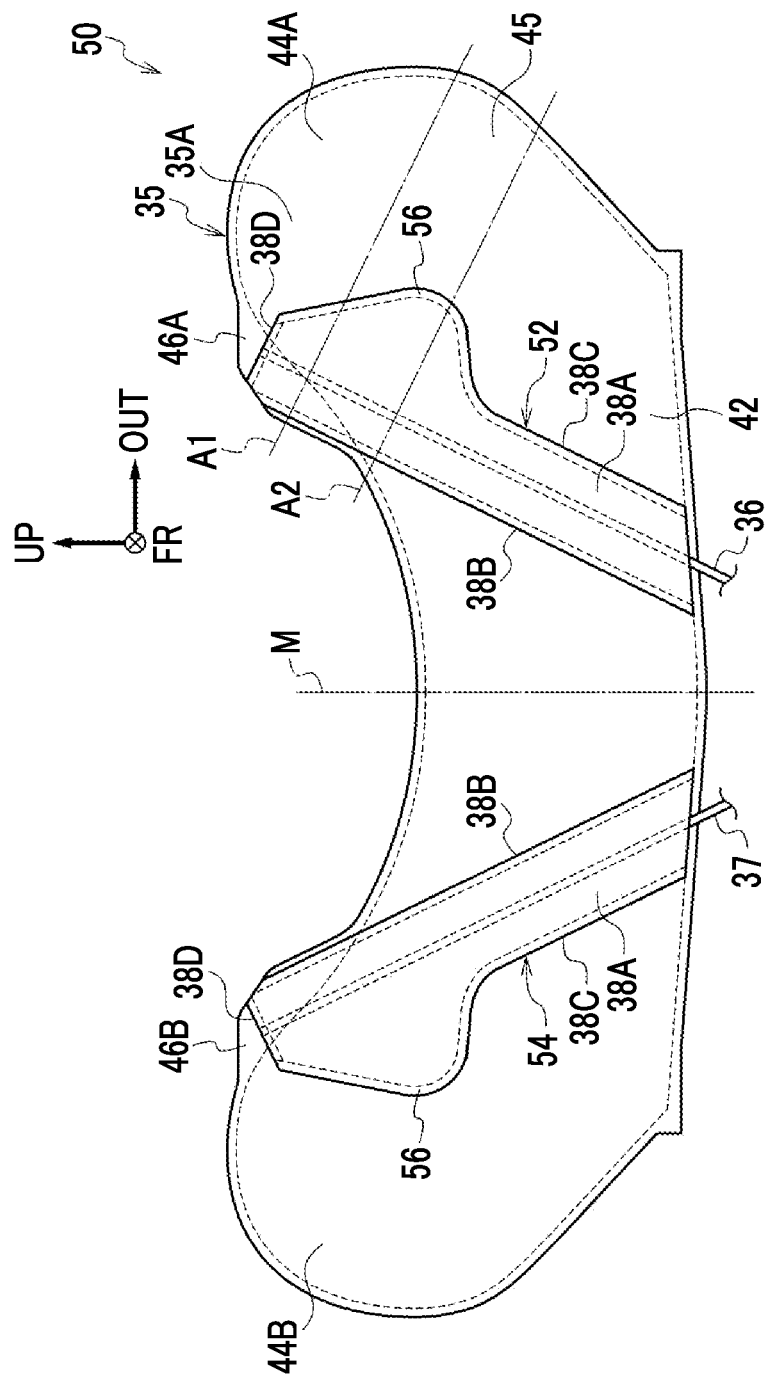
FIG. 7 is an explanatory diagram illustrating a state of an airbag according to a second embodiment where it is yet to be folded.

Illustrated in FIG. 7 is an airbag device 50 as an example of the airbag device for pedestrian protection according to the second embodiment. The airbag device 50 is arranged on the upper surface of the cowl front panel 24 (refer to FIG. 2) and stored in the airbag case 32 (refer to FIG. 2). The airbag device 50 is configured to include the inflators 34A, 34B (refer to FIG. 2), the airbag 35, the straps 36, 37, and strap covers 52, 54. The strap 36 and the strap cover 52 are disposed in bilateral symmetry with the strap 37 and the strap cover 54 with respect to the center line M and have the same configuration as the strap 37 and the strap cover 54. Accordingly, the strap 36 and the strap cover 52 will be described below with description of the strap 37 and the strap cover 54 omitted.

The strap cover 52 has, for example, the semi-cylindrical portion 38A, the sewing portions 38B, 38C, and a widened portion 56 (described later). The semi-cylindrical portion 38A constitutes the section of the strap cover 52 that ranges from its first end portion (end portion on the overhanging portion 46A side) to its second end portion (end portion on the inflator 34A (refer to FIG. 1) side). In other words, the strap cover 52 has a longitudinal length that falls short of the length of the strap 36 in its extension direction and is almost equal to the length between the overhanging portion 46A and the general portion 42 of the airbag 35.

The widened portion 56 is disposed in the strap cover 52. Specifically, the widened portion 56 is, for example, a hollow part widened in the direction intersecting with the extension direction of the strap 36 (direction almost orthogonal to the extension direction of the strap 36) on a plane including the strap 36 from the semi-cylindrical portion 38A between the center of the strap cover 52 in the longitudinal direction and the first end portion. In other words, the widened portion 56 is a part wider than the rest of the strap cover 52 (parts other than the widened portion 56). The space that is inside the widened portion 56 has a size that does not restrict the elongation (deployment) of the strap 36 during the inflation deployment of the airbag 35. The widened portion 56 is, for example, a trapezoidal part widened toward the outer side in the vehicle width direction and the side that is opposite to the overhanging portion 46A side with respect to the strap 36.

A part of the sewing portion 38C constitutes an outer edge portion of the widened portion 56. In other words, a part of the sewing portion 38C is shaped such that it is curved along the widened portion 56. A first end of the strap cover 52 is, for example, sewn to the airbag 35. A second end of the strap cover 52 is, for example, loose without being sewn to the airbag 35.

The airbag 35 is folded in accordance with a plurality of mountain and valley lines, including a mountain line A1 and a valley line A2 illustrated in FIG. 7, and is stored in the airbag case 32 (refer to FIG. 2). The mountain line A1 extends along, for example, the direction almost orthogonal to the longitudinal direction of the strap cover 52 from the overhanging portion 46A to the part of the extending portion 44A that is on the side which is opposite to the overhanging portion 46A side. The valley line A2 is, for example, set further on the inflator 34A (refer to FIG. 1) side than the mountain line A1 is and extends substantially in parallel to the mountain line A1. In other words, the strap cover 52 is folded in at least two places, including the mountain line A1 and the valley line A2.

Action

Hereinafter, an action and effects of the airbag device 50 according to the second embodiment will be described.

The airbag 35, the strap 36, and the strap cover 52 illustrated in FIG. 7 are folded in accordance with the plurality of mountain and valley lines including the mountain line A1 and the valley line A2 and are stored in the airbag case 32 (refer to FIG. 2) in the cowl portion 20. At this time, the second end of the strap 36 is attached to the inflator 34A (refer to FIG. 2). The size of the space between the strap 36 and the strap cover 52 is larger in the widened portion 56 than at the part other than the widened portion 56. Accordingly, in a case where the strap 36 is pulled to the second end for the second end of the strap 36 to be attached to the inflator 34A, the strap 36 and the strap cover 52 are less likely to come into contact with each other than in a configuration in which the strap cover 52 maintains the same width in the extension direction of the strap 36. Then, a frictional force acting on the strap 36 decreases. As a result, work for pulling the strap 36 to the second end is performed with ease in a state where the airbag 35, the strap 36, and the strap cover 52 are folded.

The airbag device 50 is completed by the folded airbag 35, the folded strap 36, and the folded strap cover 52 being stored in the airbag case 32 (refer to FIG. 2). The airbag 35 of the airbag device 50 is inflated in a case where a collision between a pedestrian and the vehicle 10 (refer to FIG. 1) is detected. After the inflation, the airbag 35 is deployed on the front surface side of the windshield glass 16 (refer to FIG. 1) and covers the cowl portion 20, the front pillar 12, and the front pillar 14 in part (refer to FIG. 1).

In the airbag device 50, the strap 36 is disposed between the airbag 35 and the strap cover 52 and the strap 36 is covered by the strap cover 52. Accordingly, in a case where the airbag 35 is deployed and the strap 36 is elongated, intrusion of another member (such as the wipers 17 (refer to FIG. 1)) into the space between the airbag 35 and the strap 36 is restricted by the strap cover 52.

Intrusion of another member into the space between the airbag 35 and the strap cover 52 is also restricted since the strap cover 52 is sewn to the airbag 35. As a result, catching of the strap 36 by another member during the deployment of the airbag 35 can be further suppressed than in a configuration lacking the strap cover 52, and thus inhibition of the deployment of the airbag 35 by the strap 36 can be suppressed.

MODIFICATION EXAMPLES

The disclosure is not limited to the embodiments described above.

The airbag 35 may be formed in a bag shape by the outer peripheral portions being woven without sewing. The airbag 35 may cover the front pillars 12, 14 in whole.

The disposition of the straps 36, 37 and the strap covers 38, 39, 52, 54 is not limited to the lower cloth 35A side (lower side in the vehicle up-down direction with respect to the airbag 35). The straps 36, 37 and the strap covers 38, 39, 52, 54 may be disposed on the upper cloth 35B side (upper side in the vehicle up-down direction with respect to the airbag 35). In the configuration, the straps 36, 37 are covered by the strap covers 38, 39, 52, 54 during the inflation deployment of the airbag 35, and thus catching of the straps 36, 37 by the hood 18 is suppressed. As a result, inhibition of the deployment of the airbag 35 by the straps 36, 37 can be suppressed.

Ends of the strap covers 38, 39, 52, 54 (that are on the sewing portion 38D, 39D sides) may be loose without sewing.

The widened portion 56 may be widened toward the overhanging portion 46A side and the inner side in the vehicle width direction with respect to the strap 36. The shape of the widened portion 56 is not limited to the trapezoidal shape, and it may be a polygonal shape such as a semicircular shape and a triangular shape. The widened portion 56 does not necessarily have to be integrated with the strap covers 52, 54. The widened portion 56 may be combined, as a separate body, with the strap covers 52, 54 by means such as sewing and adhesion.

The airbag devices for pedestrian protection according to the modification examples and the embodiments of the disclosure have been described above. The embodiments and the modification examples may be used in appropriate combination. It is a matter of course that the embodiments and the modification examples can be carried out in various forms without departing from the scope of the disclosure.

What is claimed is:

1. An airbag device for pedestrian protection, comprising:
   an airbag stored in a cowl portion of a vehicle, the vehicle including a wiper for wiping a windshield, the airbag configured to be deployed on a front surface side of a windshield, and to cover the cowl portion and front pillars at least in part;
   straps, a first end of each of the straps being attached to an upper portion of an outer surface of the airbag in a vehicle up-down direction and a second end of each of the straps being attached to the cowl portion; and
   strap covers sewn to the outer surface of the airbag and covering the straps, the straps passing between the airbag and the strap covers, each strap cover covering a corresponding strap in an extension direction along a longitudinal length of the corresponding strap, wherein
   the straps and the strap covers are disposed on a lower side in the vehicle up-down direction with respect to the airbag, and an upper side in the vehicle up-down direction with respect to the windshield and the wiper, and
   the straps and the strap covers are disposed within a wiping range during a deployment of the airbag.

2. The airbag device according to claim 1, wherein the airbag includes a lower cloth and an upper cloth sewn to the lower cloth and disposed above the lower cloth in the vehicle up-down direction and the strap covers are sewn to an outer surface of the lower cloth.

3. The airbag device according to claim 1, wherein the strap covers include widened portions wider than other parts in directions intersecting with extension directions of the straps.

4. The airbag device according to claim 3, wherein the widened portion is provided between the first end of the strap and a center of the strap covers in a longitudinal direction.

5. The airbag device according to claim 2, wherein the strap covers include a semi-cylindrical portion convex toward a lower side in the vehicle up-down direction and a rear side in a vehicle front-rear direction and sewing portions formed in both end portions of the semi-cylindrical portion in a vehicle width direction and sewn to the outer surface of the lower cloth of the airbag when viewed from a plane orthogonal to a longitudinal direction of the strap covers.

6. The airbag device according to claim 5, wherein the sewing portions have a longitudinal length falling short of a length of the straps in an extension directions and equal to a length of the semi-cylindrical portion.

7. The airbag device according to claim 1, wherein, in an inflation deployment state of the airbag, the airbag has a U-shape in vehicle plan view with a vehicle rear side of the airbag open, and the airbag includes an general portion extending in a vehicle width direction and covering a part of the cowl portion from a vehicle upper side, extending portions disposed in bilateral symmetry with respect to a center line of the airbag and respectively extending along the front pillars from a left side end portion of the general portion in the vehicle width direction and a right side end portion of the general portion in the vehicle width direction, and overhanging portions overhanging toward the center line in peripheral edge portions of the extending portions and on inner sides in the vehicle width direction.

8. The airbag device according to claim 7, wherein, in the inflation deployment state of the airbag, tips of the extending portions are positioned outside the general portion in the vehicle width direction.

9. The airbag device according to claim 7, wherein, in the inflation deployment state of the airbag, the upper portion of the outer surface of the airbag in the vehicle up-down direction is the overhanging portions.

10. The airbag device according to claim 7, wherein, in the inflation deployment state of the airbag, the overhanging portions have a trapezoidal shape.

11. The airbag device according to claim 7, wherein, in the inflation deployment state of the airbag, a first end of the strap covers in a longitudinal direction is sewn to the overhanging portions of the airbag and a second end of the strap covers in the longitudinal direction on sides opposite to the first end of the strap covers is loose without being sewn to the airbag.

12. An airbag device for pedestrian protection, comprising:
   an airbag stored in a cowl portion, the airbag configured to be deployed on a front surface side of a windshield, and to cover the cowl portion and front pillars at least in part;
   straps, a first end of each of the straps being attached to an upper portion of an outer surface of the airbag in a vehicle up-down direction and a second end of each of the straps being attached to the cowl portion; and
   strap covers sewn to the outer surface of the airbag and covering the straps, the straps passing between the airbag and the strap covers, wherein the strap covers include widened portions wider than other parts in directions intersecting with extension directions of the straps.

13. The airbag device according to claim 12, wherein the widened portion is provided between the first end of the strap and a center of the strap covers in a longitudinal direction.

14. An airbag device for pedestrian protection, comprising:
   an airbag stored in a cowl portion, the airbag configured to be deployed on a front surface side of a windshield, and to cover the cowl portion and front pillars at least in part;
   straps, a first end of each of the straps being attached to an upper portion of an outer surface of the airbag in a vehicle up-down direction and a second end of each of the straps being attached to the cowl portion; and
   strap covers sewn to the outer surface of the airbag and covering the straps, the straps passing between the airbag and the strap covers, wherein
   in an inflation deployment state of the airbag, the airbag has a U-shape in vehicle plan view with a vehicle rear side of the airbag open, and the airbag includes an general portion extending in a vehicle width direction and covering a part of the cowl portion from a vehicle upper side, extending portions disposed in bilateral symmetry with respect to a center line of the airbag and respectively extending along the front pillars from a left side end portion of the general portion in the vehicle width direction and a right side end portion of the general portion in the vehicle width direction, and overhanging portions overhanging toward the center line in peripheral edge portions of the extending portions and on inner sides in the vehicle width direction, and
   in the inflation deployment state of the airbag, a first end of the strap covers in a longitudinal direction is sewn to the overhanging portions of the airbag and a second end of the strap covers in the longitudinal direction on sides opposite to the first end of the strap covers is loose without being sewn to the airbag.

* * * * *